United States Patent
Lu et al.

(10) Patent No.: US 12,430,485 B2
(45) Date of Patent: Sep. 30, 2025

(54) VLSI PLACEMENT OPTIMIZATION USING SELF-SUPERVISED GRAPH CLUSTERING

(71) Applicant: NVIDIA Corporation, Santa Clara, CA (US)

(72) Inventors: Yi-Chen Lu, Tucker, GA (US); Tian Yang, Austin, TX (US); Haoxing Ren, Austin, TX (US)

(73) Assignee: NVIDIA Corporation, Santa Clara, CA (US)

(*) Notice: Subject to any disclaimer, the term of this patent is extended or adjusted under 35 U.S.C. 154(b) by 610 days.

(21) Appl. No.: 18/051,984

(22) Filed: Nov. 2, 2022

(65) Prior Publication Data
US 2023/0376659 A1  Nov. 23, 2023

Related U.S. Application Data

(60) Provisional application No. 63/344,486, filed on May 20, 2022.

(51) Int. Cl.
*G06F 30/327* (2020.01)
*G06F 30/347* (2020.01)
*G06F 30/392* (2020.01)
*G06F 30/398* (2020.01)
*G06F 30/337* (2020.01)

(52) U.S. Cl.
CPC .......... *G06F 30/327* (2020.01); *G06F 30/337* (2020.01); *G06F 30/347* (2020.01); *G06F 30/392* (2020.01); *G06F 30/398* (2020.01)

(58) Field of Classification Search
CPC .... G06F 30/327; G06F 30/337; G06F 30/347; G06F 30/392; G06F 30/394; G06F 30/398

USPC .......... 716/105, 124, 125, 131, 132; 703/14
See application file for complete search history.

(56) References Cited

U.S. PATENT DOCUMENTS

| | | | | |
|---|---|---|---|---|
| 5,659,717 A | * | 8/1997 | Tse | G06F 30/392 716/135 |
| 6,480,991 B1 | * | 11/2002 | Cho | G06F 30/392 716/124 |
| 9,424,282 B2 | * | 8/2016 | Plattner | G06F 16/213 |
| 11,165,646 B1 | * | 11/2021 | Ushijima-Mwesigwa | H04L 41/0893 |
| 11,617,122 B2 | * | 3/2023 | Ushijima-Mwesigwa | H04W 84/18 370/329 |

(Continued)

OTHER PUBLICATIONS

Cao et al., Chinese Patent Document No. CN-107341277-A, published Nov. 10, 2017, 3 pages including abstract, claim and 1 drawing. (Year: 2017).*

(Continued)

*Primary Examiner* — Phallaka Kik
(74) *Attorney, Agent, or Firm* — Leydig, Voit & Mayer, Ltd.

(57) ABSTRACT

A VLSI placement optimization framework receives a cell connectivity representation and cell characteristics and uses self-supervised graph clustering to optimize cell cluster assignments for power, performance, and area (PPA). The framework provides cell clustering constraints as placement guidance to commercial placers. Specifically, graph learning techniques are used to formulate the PPA metrics as machine learning loss functions that can be minimized directly through gradient descent. The framework improves the PPA metrics at the placement stage and the improvements endure to the post-route stage.

23 Claims, 11 Drawing Sheets

(56) References Cited

U.S. PATENT DOCUMENTS

| | | | | |
|---|---|---|---|---|
| 11,861,474 | B2* | 1/2024 | Foerster | G06F 16/9024 |
| 11,868,951 | B2* | 1/2024 | Fu | G01C 21/343 |
| 11,900,238 | B1* | 2/2024 | Teig | G06N 3/084 |
| 2005/0229139 | A1* | 10/2005 | Tsai | G06F 30/34 |
| | | | | 716/113 |
| 2006/0064654 | A1* | 3/2006 | Zhang | G06F 30/394 |
| | | | | 716/129 |
| 2006/0239506 | A1* | 10/2006 | Zhang | G06V 10/462 |
| | | | | 382/103 |
| 2009/0210881 | A1* | 8/2009 | Duller | G06F 9/5066 |
| | | | | 718/105 |
| 2013/0331109 | A1* | 12/2013 | Dhillon | H04W 24/02 |
| | | | | 455/446 |
| 2015/0269243 | A1* | 9/2015 | Kobayashi | G06F 16/285 |
| | | | | 707/737 |
| 2018/0307792 | A1* | 10/2018 | Kim | G03F 7/70433 |
| 2020/0065656 | A1* | 2/2020 | Song | G06N 3/08 |
| 2020/0285900 | A1* | 9/2020 | He | G06N 3/047 |
| 2020/0342297 | A1* | 10/2020 | Dai | H04L 41/0893 |
| 2022/0058328 | A1* | 2/2022 | Castle | G06F 30/27 |
| 2022/0067071 | A1* | 3/2022 | Romm | G06F 16/906 |
| 2022/0156117 | A1* | 5/2022 | Chen | G06Q 10/063 |
| 2022/0159549 | A1* | 5/2022 | Ushijima-Mwesigwa | |
| | | | | H04L 67/10 |
| 2023/0280810 | A1* | 9/2023 | Lu | G06F 1/28 |
| | | | | 713/300 |

OTHER PUBLICATIONS

Agnesina, A., et al., "VLSI Placement Parameter Optimization Using Deep Reinforcement Learning," in Proceedings of the 39th Int'l Conference on Computer-Aided Design, 1-9, 2020.

Cheng, C.K., et al., "RePlAce: Advancing Solution Quality and Rotatability Validation in Global Placement," IEEE Transactions on Computer-Aided Design and Integrated Circuits and Systems, 38, 9 (2018), 1717-1730.

Cheon, Y., et al., "Power-Aware Placement," In Proceedings of the 42nd Annual Design Automation Conference, 795-800, 2005.

Guo, Z., et al., "A Timing Engine Inspired Graph Neural Network Model for Pre-Routing Slack Prediction," In 2022 59th ACM/IEEE Design Automation Conference (DAC), IEEE.

Hagen, L., et al., "A New Approach to Effective Circuit Clustering," In IEEE/ACM International Conference on Computer Aided Design (ICCAD), IEEE, 422-427.

Hamilton, W., et al., "Inductive Representation Learning on Large Graphs," Advances in Neural Information Processing Systems 30, 2017.

He, X., et al., "Ripple 2.0: Improved Movement of Cells in Routability-Driven Placement," ACM Transactions on Design Automation of Electronic Systems (TODAES) 22, 1 (2016), 1-26.

Juang, C.C., et al., "Detailed-Routing-Driven Analytical Standard-Cell Placement," in the 20th Asia and South Pacific Design Automation Conference, IEEE, 378-383, 2015.

Huang, G., et al., "Machine Learning for Electronic Design Automation: A Survey," ACM Transactions on Design Automation of Electronic Systems (TODAES) 26, 5 (2021), 1-46.

Jin, W., et al., "EMGraph: Fast Learning-Based Electromigration Analysis for Multi-Segment Interconnect Using Graph Convolution Networks," In 2021 58th ACM/IEEE Design Automation Conference (DAC), IEEE, 919-924.

Kahng, A., "Advancing Placement," In Proceedings of the 2021 International Symposium of Physical Design, 15-22.

Kingma, D., et al., "Adam: A Method for Stochastic Optimization," arXiv preprint arXiv:1412.6980 (2014.

Kullback, S., et al., "On Information and Sufficiency," The Annals of Mathematical Statistics 22, 1 (1951), 79-86.

Lin, Y., et al., "Dreamplace: Deep Learning Toolkit-Enabled GPU Acceleration for Modern VLSI Placement," IEEE Transactions on Computer-Aided Design of Integrated Circuits and Systems 40, 4 (2020), 748-761.

Lloyd, S., "Least Squares Quantization in PCM," IEEE Transactions on Information Theory 28, 2 (1982), 129-137.

Lu, Y.C., et al., "Doomed Run Prediction in Physical Design by Exploiting Sequential Flow and Graph Learning," in 2021 IEEE/ACM International Conference on Computer Aided Design (ICCAD), IEEE, 1-9.

Lu, Y.C., et al., "RL-Sizer: VLSI Gate Sizing for Timing Optimization Using Deep Reinforcement Learning," In 2021 58th ACM/IEEE Design Automation Conference (DAC), IEEE, 733-738.

Lu, Y.C., et al., "A Fast Learning-Driven Signoff Power Optimization Framework," In Proceedings of the 2021 International Symposium on Physical Design, 7-14.

Lu, Y.C., et al., "TP-GNN: A Graph Neural Network Framework for Tier Partitioning in Monolithic 3D ICs," In 2020 57th ICM/IEEE Design Automation Conference (DAC), IEEE, 1-6.

Mallappa, U., et al., "GRA-LPO: Graph Convolution Based Leakage Power Optimization," In 2021 26th Asia and South Pacific Design Automation Conference (ASP-DAC), IEEE, 697-702.

Mirhoseini, A., et al., "A Graph Placement Methodology for Fast Chip Design," Nature 594, 7862 (2021), 207-212.

Nath, S., et al., "Machine Learning-Enabled High-Frequency Low-Power Digital Design Implementation at Advanced Process Nodes," In Proceedings of the 2021 International Symposium on Physical Design, 83-90.

Nazi, A., et al., "GAP: Generalizable Approximate Graph Partitioning Framework," arXiv preprint arXiv:1903.00614 (2019).

Pan, D., et al., "Timing-Driven Placement," Handbook of Algorithms for Physical Design Automation (2008), 423-446.

Reimers, N., et al., "Sentence-BERT: Sentence Embeddings Using Siamese BERT-Networks," arXiv preprint arXiv:1908.10084 (2019).

Shannon, C.E., "A Mathematical Theory of Communication," The Bell System Technical Journal 27, 3 (1948), 379-423.

Van Der Maaten, L., et al., "Visualizing Data Using T-SNE," Journal of Machine Learning Research 9, 11 (2008).

Vashist, D., et al., "Placement in Integrated Circuits Using Cyclic Reinforcement Learning and Simulated Annealing," arXiv preprint arXiv:2011.07577 (2020).

Ward, S., et al., "PADE: A High-Performance Placer with Automatic Datapath Extraction and Evaluation Through High-Dimensional Data Learning," in DAC Design Automation Conference 2012. IEEE.

Xie, J., et al., "Unsupervised Deep Embedding for Clustering Analysis," In International Conference on Machine Learning, PMLR, 478-487, 2016.

Xie, Z., et al., "RouteNet: Routability Prediction for Mixed-Size Designs Using Convolutional Neural Network," In 2018 EEE/ACM International Conference on Computer-Aided Design (ICCAD), IEEE, 1-8.

Xie, Z., et al., "Net2: A Graph Attention Network Method Customized for Pre-Placement Net Length Estimation," In 2021 26th Asia and South Pacific Design Automation Conference (ASP-DAC), IEEE, 671-677.

Zhang, Y., et al., "GRANNITE: Graph Neural Network Inference for Transferable Power Estimation," In 2020 57th Annual ACM/IEEE Design Automation Conference (DAC), IEEE, 1-6.

* cited by examiner expected cut-size of an edge:
$$E[e_{ab}] = P_{a1} * P_{b2} + P_{a2} * P_{b1}$$

expected cut-size of whole graph:
$$E[cut] = \sum_{i,j} E[e_{ij}] \quad \text{linearity of expectation}$$

notation:
$P_{a1}$: probability of "a" in cluster-1

VLSI PLACEMENT OPTIMIZATION USING SELF-SUPERVISED GRAPH CLUSTERING

CLAIM OF PRIORITY

This application claims the benefit of U.S. Provisional Application No. 63/344,486 titled "VLSI PLACEMENT OPTIMIZATION FOR POST-ROUTE PPA IMPROVEMENT USING SELF-SUPERVISED DEEP GRAPH CLUSTERING," filed May 20, 2022, the entire contents of which is incorporated herein by reference.

BACKGROUND

As very large scale integrated (VLSI) circuit geometries have shrunk, the relative positions of standard cell circuit layouts (cells) within a die layout is even more critical to mitigate metrics such as routing congestion, timing degradation, and excessive power dissipation. An initial placement of the cells is generated and may be refined using clustering cell placement guidance. The clustering cell placement guidance may be used by commercial place and route tools to revise the initial placement and improve total negative slack, total power consumption, and wire length for VLSI circuits. Conventional techniques identify cell clusters for placement tools based on cell similarity without optimizing metrics corresponding to routing congestion, timing, and power. In particular, conventional techniques generate graph neural network (GNN) embeddings from the input netlist and cell clusters are extracted from the GNN embeddings. The conventional techniques are feed-forward so that generation of the GNN embeddings is not goal-directed or influenced by the metrics. There is a need for addressing these issues and/or other issues associated with the prior art.

SUMMARY

Embodiments of the present disclosure relate to VLSI placement optimization using self-supervised graph clustering. A VLSI placement optimization framework receives a cell connectivity representation and cell characteristics and uses self-supervised graph clustering to optimize cell cluster assignments to improve PPA metrics. In an embodiment, the framework provides cell clustering constraints as placement guidance to commercial placers. Systems and methods are disclosed that are end-to-end differentiable, enabling feedback to modify the GNN embeddings and optimize the clustering cell placement to improve the PPA metrics. Specifically, graph learning techniques are used to formulate the PPA metrics as machine learning loss functions that can be minimized directly through gradient descent. The framework improves the PPA metrics at the placement stage and the improvements endure to the post-route stage.

In contrast to conventional systems, such as those described above, the self-supervised graph clustering technique optimizes for PPA using goal-based (metric) loss functions and gradient backpropagation. Unsupervised training is used to learn the GNN embeddings (learned embeddings) and probability clustering (Q) to optimize the metrics. Parameters used to generate the learned embeddings and Q may be updated for each training iteration. In an embodiment, a cell placement guidance system implementing the self-supervised graph clustering technique receives a connectivity representation (netlist or input graph) and cell characteristics (instance-specific power, timing, congestion) and outputs placement guidance (cell cluster assignments).

In an embodiment, the method includes receiving a connectivity representation for cell instances of an integrated circuit and processing, according to parameters, the connectivity representation and characteristics for each cell instance to generate clustering guidance for each cell instance. The method updates the parameters to optimize metrics using the clustering guidance, repeats the processing using the updated parameters to update the clustering guidance, and produces cell cluster assignments for the cell instances based on the updated clustering guidance.

BRIEF DESCRIPTION OF THE DRAWINGS

The present systems and methods for VLSI placement optimization using self-supervised graph clustering are described in detail below with reference to the attached drawing figures, wherein.

DETAILED DESCRIPTION

Figure 1A:
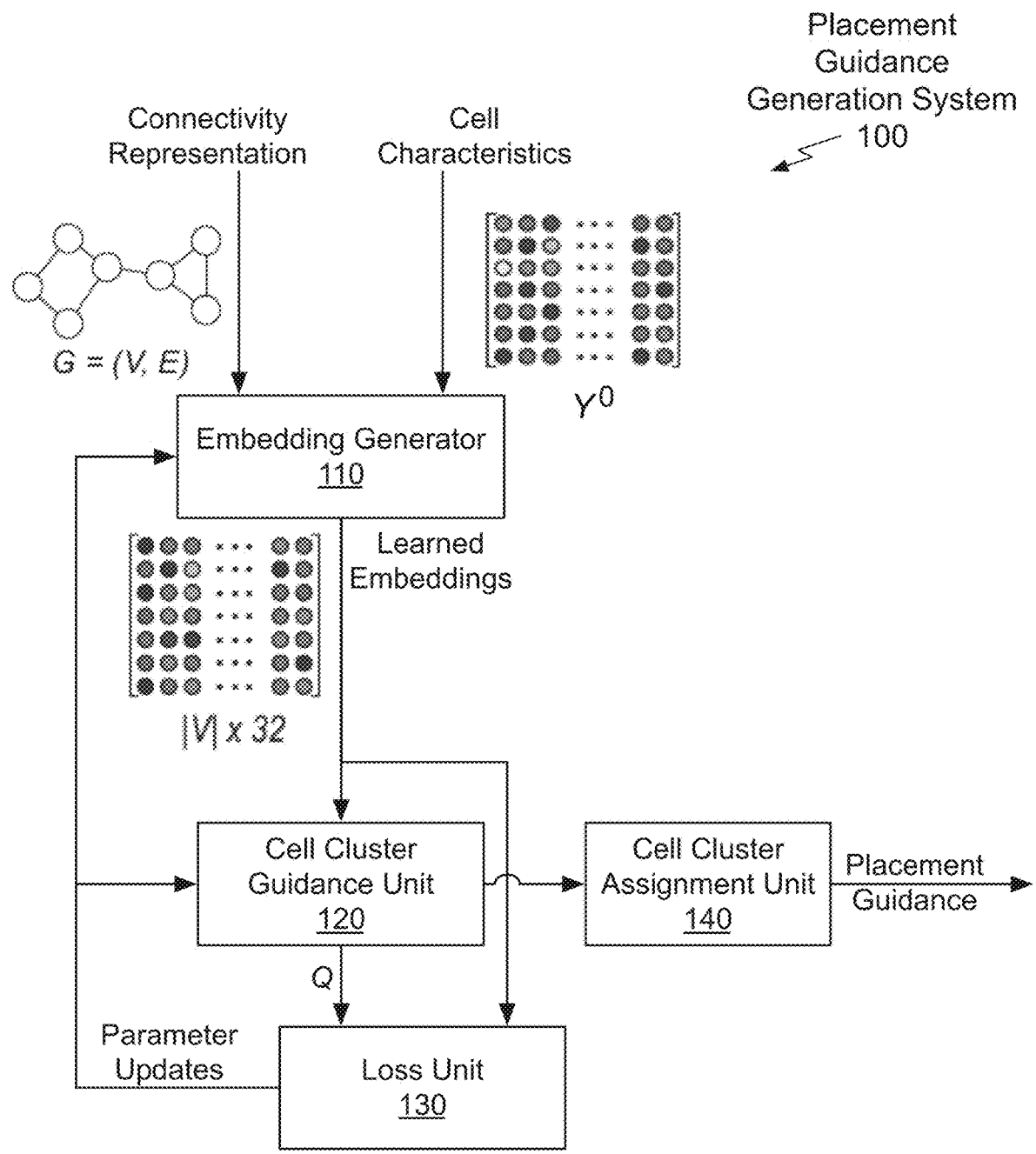
FIG. 1A illustrates a block diagram of an example placement guidance generation system suitable for use in implementing some embodiments of the present disclosure.

Systems and methods are disclosed related to VLSI circuit placement optimization using self-supervised graph clustering. During the placement stage of preparing a VLSI circuit layout for fabrication, the proposed framework learns to discover the cell clusters that are critical to such post-route PPA improvement by jointly optimizing the node embeddings and the clustering assignments that mitigate routing congestion, timing degradation, and excessive power dissipation.

Modern VLSI designs easily consist of millions of cell instances that are required to be placed and routed. However, existing commercial placers leverage various heuristics or analytical methods that do not scale globally, which often leads to sub-optimal optimization results in advanced technologies (e.g., 5 nm). To improve VLSI circuit placement, several machine learning (ML) techniques have been proposed to predict placement metrics using supervised learning. However, these supervised models require a huge amount of data for training and are limited to the technologies that are trained upon, which easily leads to poor generalization. In contrast, a PPA-directed ML framework described herein uses unsupervised learning techniques to improve commercial placers while also being able to generalize across different designs and technologies. Unlike supervised learning that requires pre-generated labels for training, unsupervised learning strives to discover hidden patterns of input data through self-representation learning.

Because VLSI circuit netlists are essentially hypergraphs, graph neural networks (GNNs) have been widely used to distill circuit information in an unsupervised manner. To improve placement optimization without supervision, conventional clustering systems first utilize a GNN model to perform node representation learning to extract placement-related cell characteristics. Second, the weighted K-means clustering algorithm is applied to identify the cell clusters that are critical to improve the initial placement. However, because the GNN embedding step and the K-means clustering step are not trainable (i.e., differentiable), the final cluster assignments have no impact on the node representation learning process, which is a severe drawback because the GNN model is unable aggregate better embeddings through the evaluations on the clustering results and therefore, the clustering algorithm cannot systematically refine the assignments based on the learned node embeddings. In sum, the node representation learning conducted by the GNN model is not "goal-directed" because the GNN embedding and the K-means clustering steps are not end-to-end trainable (i.e., differentiable).

In contrast with the conventional clustering systems, an end-to-end trainable, PPA-directed placement optimization framework is goal-directed. Given an initial placement, a placement guidance generation system learns to discover the cell clusters that are critical for post-route PPA improvements by directly minimizing PPA metrics as ML loss functions. The ML loss functions are formulated based on timing, power, and congestion analysis based on the initial placement and the clustering assignments are learned without requiring supervision. The generated clustering assignments may be provided as soft constraints to a commercial placer.

FIG. 1A illustrates a block diagram of an example placement guidance generation system 100 suitable for use in implementing some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the placement guidance generation system 100 is within the scope and spirit of embodiments of the present disclosure.

The placement guidance generation system 100 comprises an embedding generator 110, a cell cluster guidance unit 120, a loss unit 130, and a cell cluster assignment unit 140. The placement guidance generation system 100 receives a connectivity representation (netlist or input graph where each node represents a cell) and cell characteristics (initial node features including instance-specific power, timing, and congestion) and outputs placement guidance (cell cluster assignments). The placement guidance generation system 100 optimizes for PPA using goal-based (metric) loss functions and gradient backpropagation. Unsupervised training is used to learn both the (learned) embeddings and a cluster probability matrix Q to optimize the metrics. Parameters (W and μ) used to generate the learned embeddings and Q may be updated via gradient backpropagation for each training iteration.

The embedding generator 110 processes the connectivity representation G and cell characteristics $Y^0 \in R^{|V| \times |F|}$ according to parameters (W) to generate learned embeddings for each cell instance. The learned embeddings define features related to the connectivity, timing, and power consumption for each cell in the context of the cell's location within an initial placement.

A netlist for a VLSI circuit is inherently a hypergraph G=(V,E), where an edge e may connect more than two nodes (cell instances). However, because the graph learning conducted by GNNs only considers the underlying graph as an adjacency matrix A in |V|×|V| dimensions, where each element $A_{(i,j)}$ denotes whether messages can be passed from node i to node j, a hypergraph to general netlist graph (i.e., where an edge only connects two nodes) transformation should be performed prior to the graph learning process. In an embodiment, the connectivity representation that is input to the embedding generator 110 comprises a hypergraph netlist that is transformed within the embedding generator 110 to provide the netlist graph. In an embodiment, the connectivity representation that is input to the embedding generator 110 is a netlist graph produced by transforming a hypergraph netlist.

The cell cluster guidance unit 120 processes the learned embeddings according to parameters (μ) to compute cluster guidance for each cell. In an embodiment, the cluster guidance comprises the cluster probability matrix $Q \in R^{|V| \times |C|}$, where each element $Q_{ij}$ represents the probability of a cell instance i belonging to a cluster j.

Finally, given the probability matrix Q, ML loss functions are defined that are related to optimizing PPA of the underlying netlist. The loss functions may include congestion, timing, and power objectives. The loss unit 130 receives the cluster guidance and the learned embeddings and evaluates a (PPA metric) loss function to compute parameter updates. The PPA metrics are directly formulated as components of the loss function for optimization. The loss function includes components corresponding to metrics including one or more of power, timing, congestion, clustering, and similarity. A VLSI design tool-based PPA analysis of the underlying initial placement provided to the loss unit 130 may include congestion scores $H \in R^{|V|}$, maximum switching activities $S \in R^{|V|}$, and the adjacency matrix of critical timing paths Adj' that may be used to update the parameters.

Minimizing the power loss aggregates actively switching cells. Minimizing the timing loss minimizes wire lengths for timing critical paths. Minimizing the congestion loss spatially spreads out congested cells. Minimizing the clustering loss encourages convergence to the optimal cell cluster assignments. The similarity loss is computed using only the learned embeddings and is minimized to reduce long wire lengths. During the learning process, the learned embeddings and the clustering assignments are jointly refined by minimizing the proposed PPA-inspired ML loss functions using a gradient descent optimizer in an end-to-end manner.

If a path is timing critical, or a net is in high switching activity, then minimizing the timing loss shortens the path and/or the net by moving cells closer to each other in order to reduce the resistances and capacitances of the connecting net and improve the timing. In addition, if an area is highly congested, then the congestion loss spreads out cells within a region to reduce the congestion as it directly impacts the subsequent routing stage and hence the end-offlow quality of routing (QoR) metrics. To summarize, during placement optimization the placement guidance is used to improve the cell locations based on the underlying PPA evaluations. In an embodiment, ML achieves the goal of optimizing the placement in a systematic and global manner by directly formulating PPA metrics as ML loss functions and optimizing the objectives in consideration of every cell in the design.

In contrast, the conventional objective function used to guide the node representation learning is purely based on the similarity of a target node between its neighboring cells and randomly sampled cells, which is not sufficient to truly discover the cell clusters that can benefit industrial-scale designs with millions of design instances. For example, conventional systems do not consider routing congestion, timing degradation, and power dissipation, which are all the critical factors for the evaluation of whether a placement is in commercial-quality or not. Furthermore, conventional systems focus only on improvement of the metrics reported right after the placement stage for the initial placement, but fail to contemplate whether any placement improvements are beneficial to the end-of-flow PPA metrics, which are much more important. It is widely acknowledged that the popular half-perimeter wirelength (HPWL) and overflow metrics reported at the initial placement stage do not correlate well with the end-of-flow PPA metrics.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1B:
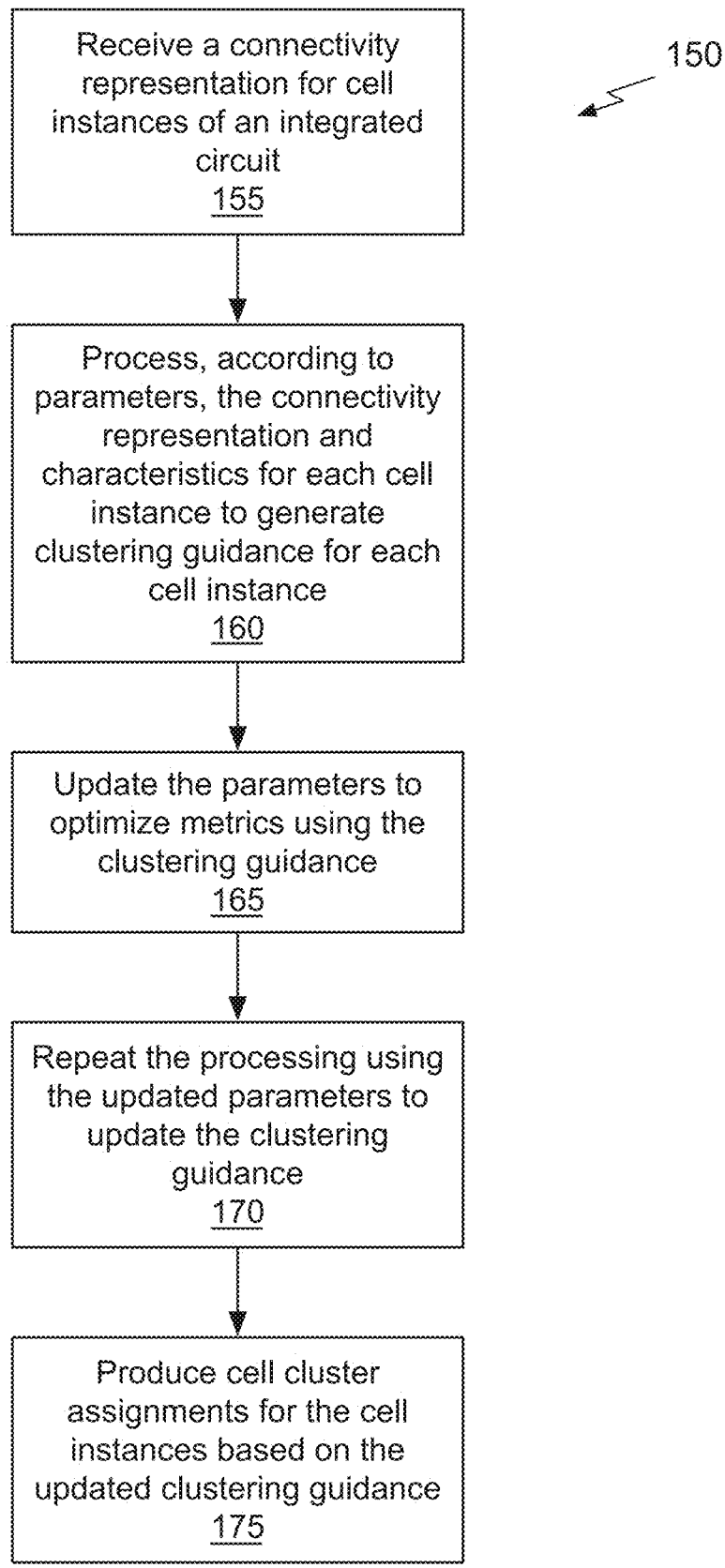
FIG. 1B illustrates a flowchart of a method for generating cell placement guidance, in accordance with an embodiment.

FIG. 1B illustrates a flowchart of a method 150 for generating cell placement guidance, in accordance with an embodiment. Each block of method 150, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 150 is described, by way of example, with respect to the placement guidance generation system 100 of FIG. 1A. However, this method may additionally or alternatively be executed by any one system, or any combination of systems, including, but not limited to, those described herein. Furthermore, persons of ordinary skill in the art will understand that any system that performs method 150 is within the scope and spirit of embodiments of the present disclosure.

At step 155, a connectivity representation for cell instances of an integrated circuit is received at the placement guidance generation system 100. In an embodiment, the connectivity representation comprises a netlist graph and each cell instance corresponds to a node in the netlist graph. In an embodiment, before step 155 or 160, the netlist graph is transformed as described in conjunction with FIGS. 2A and 2B, by inserting an edge corresponding to a timing path between a start point and an end point of the timing path, the edge bypassing at least one node between the start point and the end point.

At step 160, the connectivity representation and characteristics for each cell instance are processed by the embedding generator 110 and the cell cluster guidance unit 120, according to parameters, to generate clustering guidance for each cell instance. In an embodiment, the characteristics for each cell instance comprise estimated timing, power consumption, and congestion for an initial placement.

In an embodiment, the parameters are initialized by producing learned embeddings for each cell instance from the connectivity representations and the characteristics and a first portion of the parameters is computed to minimize a similarity loss for the learned embeddings. In an embodiment, a second portion of the parameters is computed from the learned embeddings. In an embodiment, the clustering guidance comprises clustering probabilities for each cell instance. In an embodiment, the processing comprises producing learned embeddings for each cell instance by the embedding generator 110 applying a first portion of the parameters to the connectivity representation and the characteristics and applying a second portion of the parameters to the learned embeddings by the cell cluster guidance unit 120 to compute the clustering guidance for each cell instance.

Prior to the graph learning process, initial characteristics (e.g., node-specific features) are obtained for each design cell instance (i.e., cell), which include physical information for the a cell instance and timing and power related attributes specific to the cell instance. However, these initial characteristics are not sufficient to identify the essential cell clusters for placement optimization because the characteristics do not represent connectivity between the cell instances. Examples of the characteristics for each cell instance may include memory affinity (e.g., shortest logic distance to each memory), worst slack value at the cell output pin(s), maximum transition (slew) at the cell output pin(s), maximum transition (e.g. slew) at for the cell input pin(s), largest switching activity value among the nets within the cell, and (x,y) location of the initial placement for the cell. To obtain better representations for each cell instance, the embedding generator 110 to performs node representation learning as:

$$y_{N(v)}^{k-1} = \text{mean\_pool}(\{W_k^{agg} y_u^{k-1}, \forall u \in N(v)\}),$$

$$y_v^k = \text{sigmoid}(W_k^{proj} \cdot \text{concat}[y_v^{k-1}, y_{N(v)}^{k-1}]), \quad \text{Eq. (1)}$$

where $N(v)$ denotes the neighbors of node v, $W_k^{agg}$, and $W_k^{proj}$ denote the aggregation and projection matrices at the k-th processing layer of the embedding generator 110. After the transformation through equation (1), the characteristics of each cell $y_v^0$ are transformed into $y_v^K$, where K denotes the total number of processing layers in the embedding generator 110. The dimensions of $y_v^K$ is subject to the number of neurons at the last layer. In an embodiment, K=6 and $\dim(y_v^K)$=32.

At step 165, the parameters are updated to optimize metrics using the clustering guidance. In an embodiment, updating the parameters comprises minimizing a loss function computed by the loss unit 130 using the clustering guidance for the metrics, where the metrics include at least one of a timing loss, a congestion loss, and a power loss. In an embodiment, the loss function includes a clustering loss that is computed using the clustering guidance.

At step 170, the processing performed at step 160 is repeated using the updated parameters to update the clustering guidance. In an embodiment, the processing and updating performed at steps 160 and 165 is repeated multiple times before proceeding to step 175. In an embodiment, the processing and updating is performed at steps 160 and 165 until the loss function is minimized.

At step 175, cell cluster assignments are produced for the cell instances based on the updated clustering guidance. In an embodiment, the cell cluster assignments for each cell instance are produced by identifying a highest probability value defined in the updated clustering guidance. In an embodiment, at least one of steps 155, 160, 165, and 175 are performed on a server or in a data center to produce the cell cluster assignments, and the cell cluster assignments are streamed to a user device. In an embodiment, at least one of steps 155, 160, 165, and 175 are performed within a cloud computing environment. In an embodiment, the integrated circuit is employed in a machine, robot, or autonomous vehicle. In an embodiment, at least one of steps 155, 160, 165, and 175 are performed on a virtual machine comprising a portion of a graphics processing unit.

As previously described, the loss unit 130 may compute a "similarity loss" as an objective which is directly calculated from the above learned embeddings $\{y^K\}$. The purpose of the similarity loss is to encourage cells on the same net to have higher probability of being assigned into the same cluster, while causing cells that are logically distant to have lower probability, which therefore minimizes the chances of creating long nets. The loss function $L_{sim}$ is defined as:

$$L_{sim}=E_v(-E_{u \in N(v)}{}^{log}(\sigma(y_v^T y_u))-\Sigma_{k \sim rand}{}^{log}(\sigma(-y_v^T y_u))). \quad \text{Eq. (2)}$$

where $y_v$ denotes the learned embeddings of node v, $\sigma$ denotes the sigmoid function, and rand denotes the random sampling operation over the full netlist graph. By minimizing equation (2), neighboring nodes will be encouraged to have similar embeddings y, which increases the probability of the neighboring nodes being assigned to the same cluster and hence prevents creating long pin-to-pin connections between cells.

Unlike conventional techniques that rely on the weighted K-means clustering to heuristically determine cell clusters, the PPA-directed clustering technique identifies the essential cell clusters by formulating PPA as ML loss functions. One of the main challenges of the clustering task is the non-existence of label guidance. To overcome this challenge, a self-reinforcing method iteratively converts "distances" of trained embeddings {y} produced by embedding generator 110 into probabilities of clustering assignments. In other words, at every training iteration where an updated embedding matrix is obtained, for each node, the embedding distance from the node to each cluster center at the previous iteration is computed. Particularly, the distance-to-probability conversion is performed as:

$$Q_{ic} = \frac{(1 + \|y_i - \mu_c\|^2)^{-1}}{\sum_k (1 + \|y_i - \mu_k\|^2)^{-1}}. \quad \text{Eq. (3)}$$

where $Q_{ic}$ denotes the probability of node i belonging to cluster c, $y_i$ denotes the learned embeddings of node i, and $\mu_c$ denotes the embeddings of centroid c, and $\|\cdot\|^2$ denotes the Euclidean distance. Note that $\mu_c$ is a trainable vector that is improved in every iteration and that $\mu_c$ is computed by calculating the center of gravity of all the nodes belonging to cluster c in the previous iteration. To optimize the clustering assignments (i.e., matrix Q) in a self-reinforcing manner, a target matrix P is constructed by strengthening the assignments of Q as:

$$P_{ic} = \frac{Q_{ic}^2 / \sum_i Q_{ic}}{\sum_k Q_{ik}^2 / \sum_i Q_{ik}}. \quad \text{Eq. (4)}$$

The rationale behind equation (4) is that since Q is a stochastic matrix which means $0 \leq Q_{ic} \leq 1$, raising and then normalizing by the second power will make the probability distribution of each row (i.e., assignment distribution of a cell) skew towards to the largest value. Each column of the matrix Q corresponds with a different cluster and $\Sigma_i Q_{ic}$ represents the frequency of each cluster. Hence, the clustering assignments are strengthened in a self-supervised manner. Therefore, without any supervised labels provided manually, the placement guidance generation system 100 improves the assignments and ultimately discovers the optimized cell clusters.

Now, with the target matrix P and the approximate matrix Q, the clustering loss $L_{cl}$ is defined as:

$$L_{cl}=KL(P\|Q), \quad \text{Eq. (5)}$$

where KL denotes the Kullback-Leibler divergence. Minimizing equation (5) will encourage the matrix Q to approximate the matrix P. To this end, the gap is bridged between node representation learning and cell clustering by converting the learned embeddings into cell clustering probabilities. With the probability matrix Q that represents clustering assignments, the "expected" impact on important PPA metrics can be further quantified.

Figure 1C:
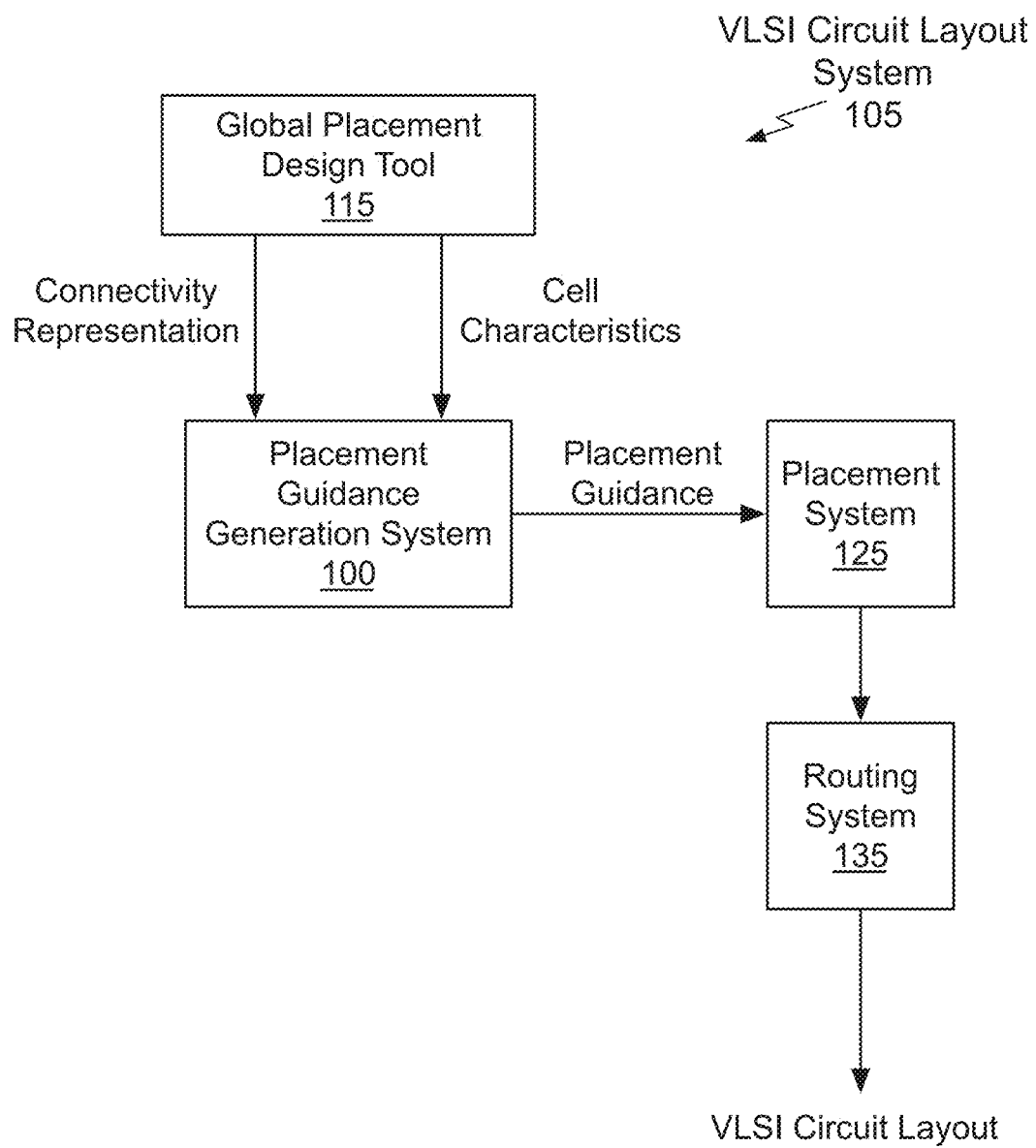
FIG. 1C illustrates a block diagram of an example VLSI circuit layout system suitable for use in implementing some embodiments of the present disclosure.

FIG. 1C illustrates a block diagram of an example VLSI circuit layout system suitable 105 for use in implementing some embodiments of the present disclosure. The VLSI circuit layout system 105 comprises a global placement design tool 115, the placement guidance generation system 100, a placement system, and a routing system 135. The global placement design tool 115 receives a VLSI design and performs an initial placement of the cells. The global placement design tool 115 also computes the cell characteristics. The placement guidance generation system 100 processes the connectivity representation and the cell characteristics, iteratively learning the node embeddings and clustering guidance without supervision. Importantly, supervision requires a ground truth clustering for each VLSI design and such a ground truth clustering is not available. When the loss function computed by the placement guidance generation system 100 is minimized, the placement guidance is generated from the clustering guidance. The placement system refines the initial placement output by the global placement design tool 115 based on the placement guidance. The routing system 135 completes routing of the placed cells to produce a VLSI circuit layout for fabrication. Final PPA results may also be generated for comparison with the PPA metrics.

Figure 2A:
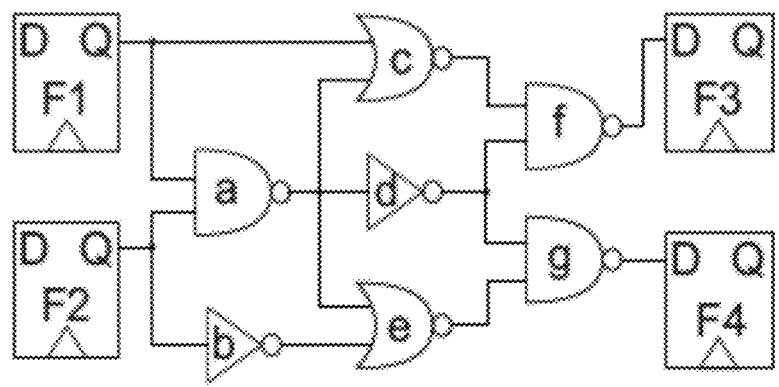
FIG. 2A illustrates a netlist, in accordance with an embodiment.

FIG. 2A illustrates a netlist, in accordance with an embodiment. Each edge e may connect more than two nodes (cell instances, such as F1, F2, F3, F4, a, b, c, d, e, f, and g).

However, because the graph learning conducted by GNNs only considers the underlying graph as an adjacency matrix A in $|V|\times|V|$ dimensions, where each element $A_{(i,j)}$ denotes whether messages can be passed from node i to node j, a transformation should be performed prior to the graph learning process. The hypergraph is transformed to general netlist graph, where an edge only connects two nodes. As previously described, the hypergraph is converted to a net graph for input to the placement guidance generation system 100.

Conventional techniques use a hypergraph to clique-based graph transformation to obtain the adjacency matrix. Nonetheless, such transformation suffers from the fact that the number of edges in the transformed graph will grow quadratically with the number of nodes in the original netlist, which is undesirable for large-scale industrial designs and often leads to suboptimal node embeddings. To overcome this issue, a transformation method that honors the netlist underlying signal propagation flow may be used.

Figure 2B:
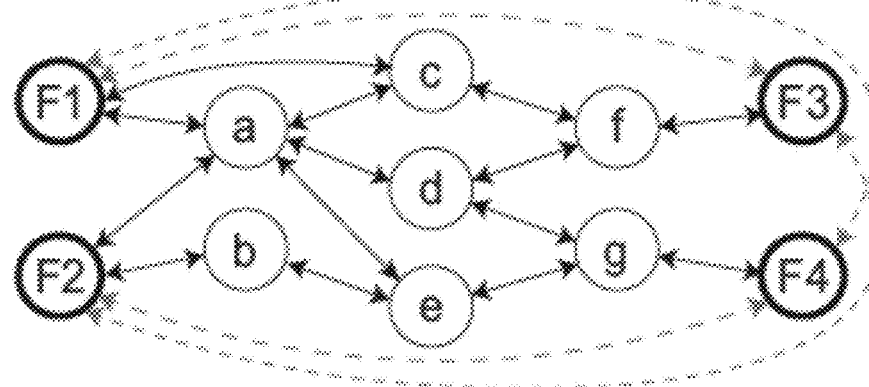
FIG. 2B illustrates the netlist of FIG. 2A transformed as an input graph, in accordance with an embodiment.

FIG. 2B illustrates the netlist of FIG. 2A transformed as an input graph, in accordance with an embodiment. The transformation consists of two parts. First, for every net (e.g., hyperedge) in the original hypergraph, only the driver-to-load connection(s) is added in the transformed graph (shown as solid bidirectional arrows) instead of forcing every cell instance on the same net to have a connection between each other. Second, given that the receptive field of a GNN model is limited by the number of layers in the GNN model, "artificial" edges (shown as dashed bidirectional arrows) are introduced to connect start points with end points on timing paths in the transformed net graph. The rationale is that the start-point and end-point often contains critical timing information such as skew. By directly connecting the start and end points artificially, the issue of limited receptive field of the GNN model may be efficiently overcome. In contrast with the quadratic growth of the conventional technique, the number of edges grows pseudo-linearly with respect to the number of nodes, which is fully scalable for industrial designs with millions of cells. The embedding generator 110 may be configured to perform the transformation of the original hypergraph to the connectivity representation, including the insertion of the artificial edges.

As previously described, the loss unit 130 may optimize objectives for similarity and clustering losses. Additionally, the ML loss function implemented by the loss unit 130 may also be defined for directly optimizing PPA in the learning process. Given the probability matrix Q that represents the current clustering results, the expected PPA impact of the current cluster assignments can be calculated (for each iteration). Specifically, the congestion, timing, and power metrics may be improved.

Figure 3A:
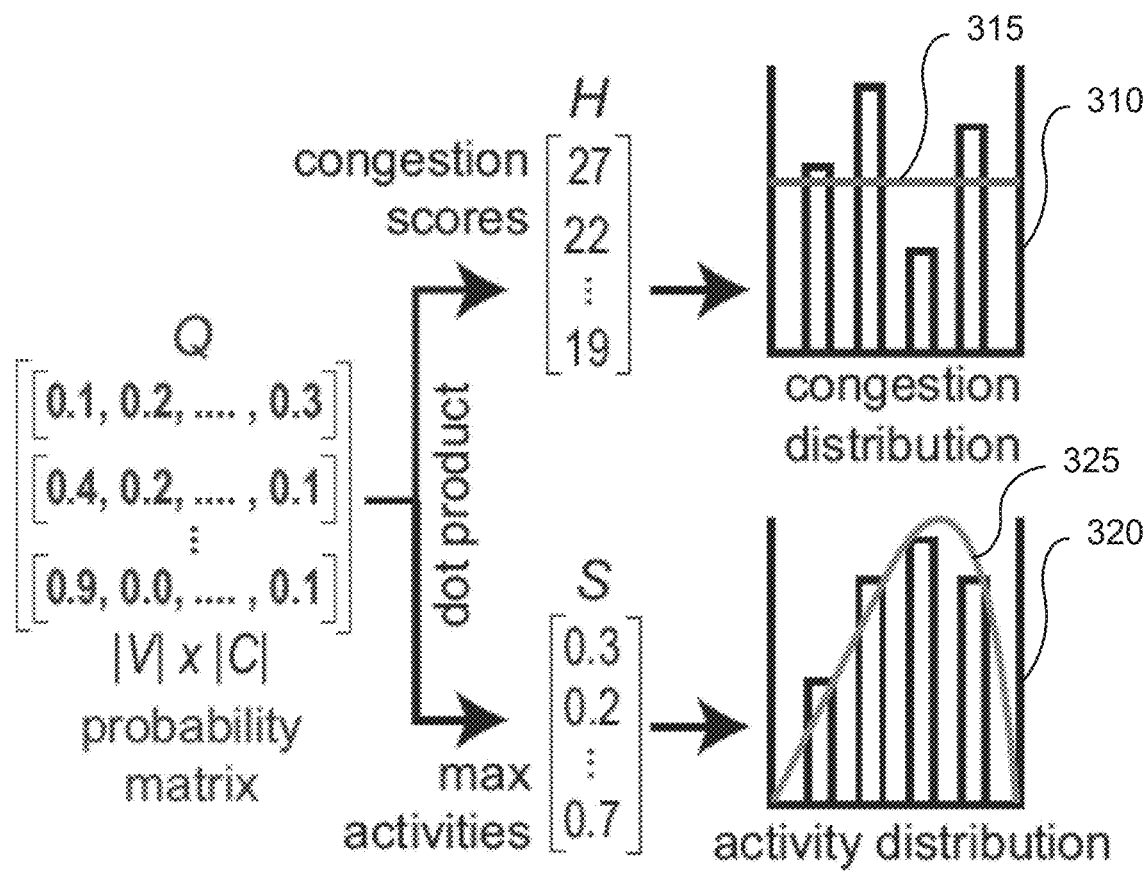
FIG. 3A illustrates congestion loss and power loss formulations, in accordance with an embodiment.

FIG. 3A illustrates congestion loss and power loss formulations, in accordance with an embodiment. The congestion loss and power loss formulations rely on entropy maximization and minimization, respectively. Note that both distributions are normalized as probabilities. Congestion is one of the most important placement objectives as it highly correlates with the ability to route the VLSI design which directly impacts the PPA of the final VLSI circuit layout. By improving (reducing) congestion, the clustering assignments can be adjusted as probabilities to spread out cells in the congested regions. To formulate a congestion objective into an ML loss function, the concept of Shannon entropy which quantifies the "randomness" of probability distributions is adopted. The congestion loss function $L_{cong}$ is defined as:

$$\max \text{entropy}(Q^T H) \rightarrow L_{cong} = -\text{entropy}(Q^T H), \quad \text{Eq. (6)}$$

where $H \in R^{|V|}$ is a vector that denotes the congestion score of each cell, $Q^T H \in R^{|C|}$ thus represents the expected congestion score of each cluster. Finally, entropy(•) denotes the function mapping that first normalizes each element by the sum of all elements, and then calculates the Shannon entropy of the normalized probability vector. With equation (6), the probability matrix Q will be encouraged to spread out cells in the congested regions as the maximum entropy y is achieved by having an equal amount of congestion $$\left(\text{i.e., } \frac{\sum_v H_v}{|C|}\right)$$

in each cluster. An example graph 310 of the congestion objective is shown in the upper-part of FIG. 3A. The entropy is maximized as the congestion distribution becomes more uniform in value, where a line 315 corresponds to a uniform distribution.

To improve power dissipation of high-performance designs (e.g., GPU/CPU designs), dynamic power may be improved by shortening the nets with high switching activity to reduce the wire capacitances of the high switching activity nets. The power objective $L_{power}$ is formulated as:

$$\min \text{entropy}(Q^T S) \rightarrow L_{power} = -\text{entropy}(Q^T S), \quad \text{Eq. (7)}$$

where $S \in R^{|V|}$ represents the largest switching activity of the nets to which a cell is connected. The idea behind equation (7) is similar to that of the congestion loss. An example graph 320 of the switching activity is shown in the bottom-part of FIG. 3A. The entropy is maximized as the congestion distribution becomes more uniform in value, where a line 315 corresponds to a uniform distribution. The difference compared with optimizing congestion, is that for switching activity the entropy is minimized rather than being maximized to aggregate the cells that are connected to high switching activity nets into clusters and shorten their interconnects. The entropy is minimized as the switching activity distribution becomes more gathered, where a curve 325 corresponds to a gathered distribution.

In addition to the congestion loss $L_{cong}$ and the power loss $L_{power}$, the loss function may also include a timing loss $L_{timing}$. Improving timing lets cells on timing critical paths have higher chances of being clustered into the same group. To achieve this, the "cut-size" of timing critical paths are formulated as an ML loss function, which is resulted from the current clustering assignments Q.

Figure 3B:
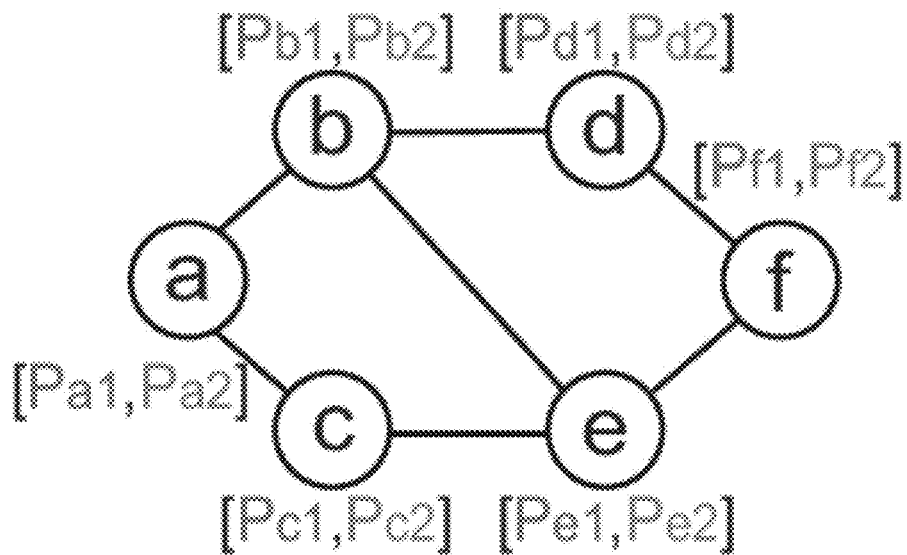
FIG. 3B illustrates cut-size loss formulation, in accordance with an embodiment.

FIG. 3B illustrates cut-size loss formulation, in accordance with an embodiment. Note that although a two-way partitioning example is shown in FIG. 3B, the formulation can be easily extended to handle multi-way partitioning through matrix factorization. For |C|-way partitioning, the cut-size may be formulated as timing loss $L_{timing}$ based on the probability matrix $Q \in R^{|V| \times |C|}$ as:

$$L_{timing} = \text{reduce\_sum}(Q(1-Q)^T \odot A_{critic}) \quad \text{Eq. (8)}$$

where $A_{critic}$ denotes the adjacency matrix of timing critical paths, reduce_sum(•) denotes the operation that adds up all the input elements, and $\odot$ denotes the element-wise multiplication.

The objectives may be jointly optimized by the loss unit 130 using a gradient descent optimizer (e.g., Adam) to minimize the weighted sum of each objective as:

$$L = L_{sim} + \lambda_1 L_{cf} + \lambda_2 L_{cong} + \lambda_3 L_{timing} + \lambda_4 L_{power}, \quad \text{Eq. (9)}$$

where $\lambda_i > 0$ controls the contribution of each objective to the clustering assignment. After the training is complete, the final clustering assignment of each cell v is obtained as:

$$\text{assignment of node } v = \underset{c}{\arg\max}\, Q_{vc}. \qquad \text{Eq. (10)}$$

Algorithm 1 shown in TABLE 1 summarizes the training process. In Lines 1-4, first the parameters (weights) for the embedding generator 110 and cell cluster guidance unit 120 (GNN) are pre-trained using the similarity loss (Equation 2). Then, in Lines 5-6, based on the pre-trained embeddings, the initial clustering centers $\{\mu\}$ (i.e., centroids) are obtained in high dimensions using the K-means algorithm and the centroids are made trainable by adding them to the ML computational graph. Note that the K-means algorithm is only conducted once and for all to obtain the initial clusters. In Lines 7-19, each objective function is computed as described in the above equations and the objective functions are jointly optimized using gradient descent.

In Lines 11-12, the target matrix P is updated once in every three iterations to stabilize the convergence. Finally, the computed gradients are taken to update the parameters in the underlying ML computational graph including the weight matrices $\{W\}$ used by the embedding generator 110 and the center locations $\{\mu\}$ used by the cell cluster guidance unit 120. Note that the entire training is unsupervised which means the placement guidance generation system 100 can be applied to any design, and the training runtime may take less than 30 minutes on commercial designs with millions of cells when executed on a single high-performance GPU or CPU. The ability to generate placement guidance for any VLSI design is a consequence of the unsupervised training. Overall, the placement guidance generation system 100 is compatible with commercial tools, improves placement and post-route results, and is not design dependent.

TABLE 1

Algorithm 1 End-to-End Unsupervised Training Methodology.
We use default values of sim_epoch = 10,
full_epoch = 50, $\alpha$ = 0.001, $\beta_1$ = 0.9, $\beta_2$ = 0.999,
$\lambda_1$ = 1, $\lambda_2$ = 10, $\lambda_3$ = 1, $\lambda_4$ = 0.5.

Input: G = (V, E): transformed graph. $\{y^0\}$: initial node features.
$H \in R^{|V|}$: congestion scores. $A_{critic}$: critical path adjacency
matrix. $S \in R^{|V|}$: maximum switching activities. $\{W\}$: weights
of GNN. sim_epoch: number of epochs for similarity-only learning. full_epoch: number of epochs for full-objective learning.
$\{\beta_1, \beta_2\}$: Adam params. $\alpha$: learning rate. $\{\lambda\}$: objective weights.
Output: $Z \in R^{|V|}$: final clustering assignment of each cell
1:    for i = 0; i < sim_epoch; ++i do  ▷ Pre-train GNN weights
2:    | y ← GNN(G, $y^0$, W)  ▷ GNN embeddings by Equation 1
3:    | $L_{sim}$ ← sim_loss (y)  ▷ similarity loss by Equation 2
4:    | W ← Adam ($L_{sim}$, $\beta_1$, $\beta_2$, $\alpha$; W)  ▷ update GNN
5:    $\{\mu\}$ ← obtain initial centroids from y using K-means
6:    add $\{\mu\}$ to ML computational graph  ▷ make $\{u\}$ trainable
7:    for i = 0; i < full_epoch; ++i do
8:    | y ← GNN(G, $y^0$; W)  ▷ GNN embeddings by Equation 1
9:    | $L_{sim}$ ← sim_loss (y)  ▷ similarity loss by Equation 2
10:   | Q ← probability matrix from $\{y, \mu\}$  ▷ by Equation 3
11:   | if i % 3 == 0 then
12:   | | P ← target matrix from Q  ▷ by Equation 4
13:   | $L_{cl}$ ← clustering loss from $\{P, Q\}$  ▷ by Equation 5
14:   | $L_{cong}$ ← congestion loss from $\{Q, H\}$  ▷ by Equation 6
15:   | $L_{timing}$ ← timing loss from $\{Q, A_{critic}\}$  ▷ by Equation 8
16:   | $L_{power}$ ← power loss from $\{Q, S\}$  ▷ by Equation 7
17:   | $L = L_{sim} + \lambda_1 L_{cl} + \lambda_2 L_{cong} + \lambda_3 L_{timing} + \lambda_4 L_{power}$
18:   | W, $\mu$ ← Adam (L, $\beta_1$, $\beta_2$, $\alpha$; W, $\mu$)▷ update GNN, centroids
19:   Z ← get argmax of Q by row  ▷ final clustering assignments The goal of the placement guidance generation system 100 is to provide a generalizable placement optimization framework that can improve the PPA metrics at the end of the VLSI design flow with little runtime overhead. It is no doubt that the ultimate goal of every VLSI circuit layout (physical) implementation is to meet the end-of-flow PPA target closures, which may be achieved starting from an improved placement that benefits from the placement guidance.

Directly formulating PPA metrics as ML loss functions that are optimized, improves the placement quality of commercial tools that are widely used across the entire semiconductor industry. End-to-end unsupervised training of the placement guidance generation system 100 ensures that the embedding learning and the clustering assignments are jointly updated in a goal-directed manner. Not only does the placement guidance generated by placement the guidance generation system 100 immediately improve the PPA metrics at the placement stage, but the improvements also persist to the post-route stage.

Parallel Processing Architecture

Figure 4:
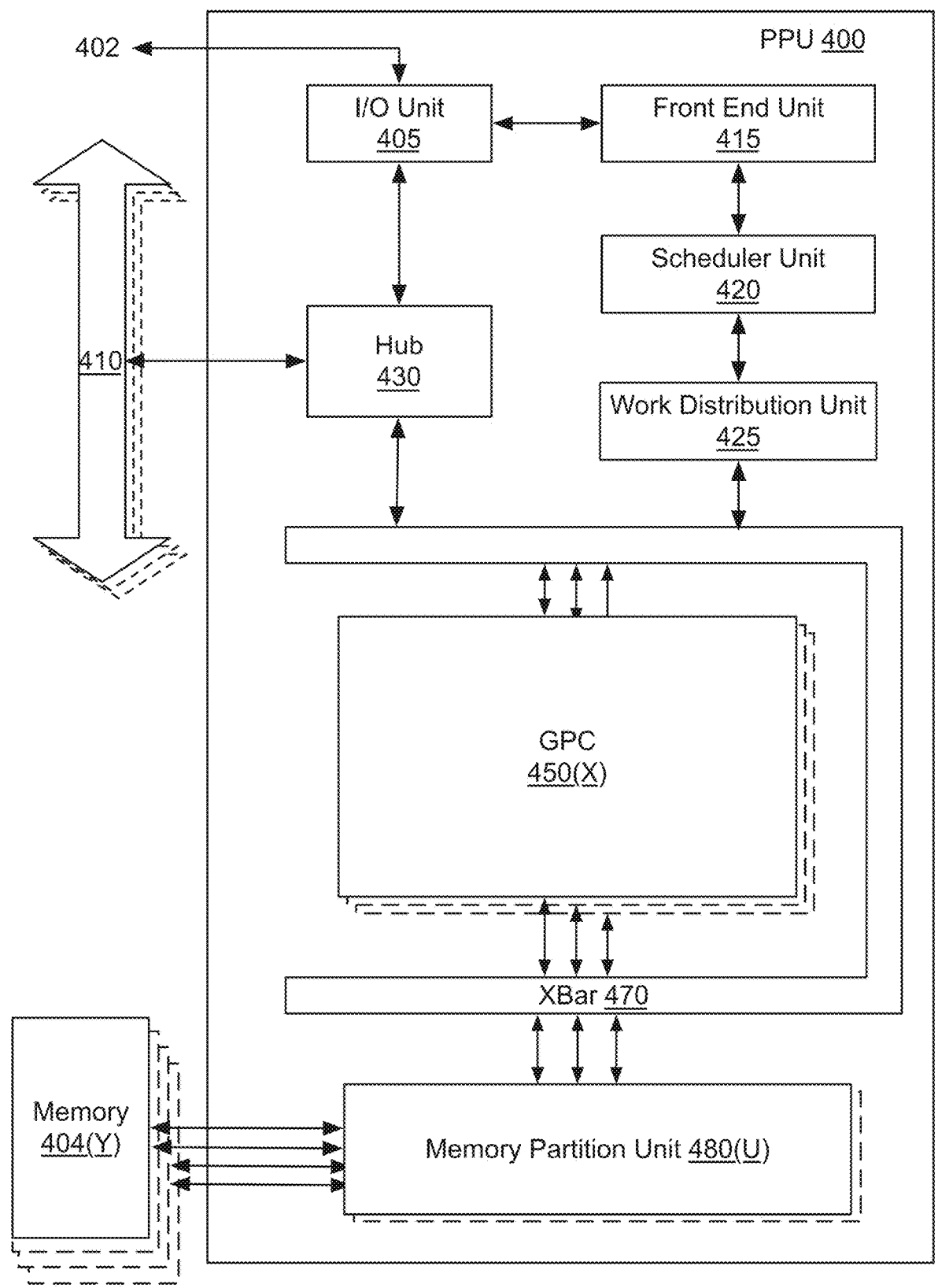
FIG. 4 illustrates an example parallel processing unit suitable for use in implementing some embodiments of the present disclosure.

FIG. 4 illustrates a parallel processing unit (PPU) 400, in accordance with an embodiment. The PPU 400 may be used to implement the placement guidance generation system 100. The PPU 400 may be used to implement one or more of the embedding generator 110, cell cluster guidance unit 120, loss unit 130, and cell cluster assignment unit 140 within the placement guidance generation system 100. In an embodiment, a processor such as the PPU 400 may be configured to implement a neural network model. The neural network model may be implemented as software instructions executed by the processor or, in other embodiments, the processor can include a matrix of hardware elements configured to process a set of inputs (e.g., electrical signals representing values) to generate a set of outputs, which can represent activations of the neural network model. In yet other embodiments, the neural network model can be implemented as a combination of software instructions and processing performed by a matrix of hardware elements. Implementing the neural network model can include determining a set of parameters for the neural network model through, e.g., supervised or unsupervised training of the neural network model as well as, or in the alternative, performing inference using the set of parameters to process novel sets of inputs.

In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device. In other embodiments, the PPU 400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, cloud computing, and machine learning applications.

The PPU 400 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front end unit 415, a scheduler unit 420, a work distribution unit 425, a hub 430, a crossbar (Xbar) 470, one or more general processing clusters (GPCs) 450, and one or more memory partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory 404 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 5B.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front end unit 415 receives pointers to one or more command streams. The front end unit 415 manages the one or more streams, reading commands from the streams and forwarding commands to the various units of the PPU 400.

The front end unit 415 is coupled to a scheduler unit 420 that configures the various GPCs 450 to process tasks defined by the one or more streams. The scheduler unit 420 is configured to track state information related to the various tasks managed by the scheduler unit 420. The state may indicate which GPC 450 a task is assigned to, whether the task is active or inactive, a priority level associated with the task, and so forth. The scheduler unit 420 manages the execution of a plurality of tasks on the one or more GPCs 450.

The scheduler unit 420 is coupled to a work distribution unit 425 that is configured to dispatch tasks for execution on the GPCs 450. The work distribution unit 425 may track a number of scheduled tasks received from the scheduler unit 420. In an embodiment, the work distribution unit 425 manages a pending task pool and an active task pool for each of the GPCs 450. As a GPC 450 finishes the execution of a task, that task is evicted from the active task pool for the GPC 450 and one of the other tasks from the pending task pool is selected and scheduled for execution on the GPC 450. If an active task has been idle on the GPC 450, such as while waiting for a data dependency to be resolved, then the active task may be evicted from the GPC 450 and returned to the pending task pool while another task in the pending task pool is selected and scheduled for execution on the GPC 450.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QoS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. The tasks may be allocated to one or more processing units within a GPC 450 and instructions are scheduled for execution by at least one warp.

The work distribution unit 425 communicates with the one or more GPCs 450 via XBar 470. The XBar 470 is an interconnect network that couples many of the units of the PPU 400 to other units of the PPU 400. For example, the XBar 470 may be configured to couple the work distribution unit 425 to a particular GPC 450. Although not shown explicitly, one or more other units of the PPU 400 may also be connected to the XBar 470 via the hub 430.

The tasks are managed by the scheduler unit 420 and dispatched to a GPC 450 by the work distribution unit 425. The GPC 450 is configured to process the task and generate results. The results may be consumed by other tasks within the GPC 450, routed to a different GPC 450 via the XBar 470, or stored in the memory 404. The results can be written to the memory 404 via the memory partition units 480, which implement a memory interface for reading and writing data to/from the memory 404. The results can be transmitted to another PPU 400 or CPU via the NVLink 410. In an embodiment, the PPU 400 includes a number U of memory partition units 480 that is equal to the number of separate and distinct memory devices of the memory 404 coupled to the PPU 400. Each GPC 450 may include a memory management unit to provide translation of virtual addresses into physical addresses, memory protection, and arbitration of memory requests. In an embodiment, the memory management unit provides one or more translation lookaside buffers (TLBs) for performing translation of virtual addresses into physical addresses in the memory 404.

In an embodiment, the memory partition unit 480 includes a Raster Operations (ROP) unit, a level two (L2) cache, and a memory interface that is coupled to the memory 404. The memory interface may implement 32, 64, 128, 1024-bit data buses, or the like, for high-speed data transfer. The PPU 400 may be connected to up to Y memory devices, such as high bandwidth memory stacks or graphics double-data-rate, version 5, synchronous dynamic random access memory, or other types of persistent storage. In an embodiment, the memory interface implements an HBM2 memory interface and Y equals half U. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with each HBM2 stack including two 128-bit channels per die for a total of 8 channels and a data bus width of 1024 bits.

In an embodiment, the memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 404 or other system memory may be fetched by the memory partition unit 480 and stored in the L2 cache 460, which is located on-chip and is shared between the various GPCs 450. As shown, each memory partition unit 480 includes a portion of the L2 cache associated with a corresponding memory 404. Lower level caches may then be implemented in various units within the GPCs 450. For example, each of the processing units within a GPC 450 may implement a level one (L1) cache. The L1 cache is private memory that is dedicated to a particular processing unit. The L2 cache 460 is coupled to the memory interface 470 and the XBar 470 and data from the L2 cache may be fetched and stored in each of the L1 caches for processing.

In an embodiment, the processing units within each GPC 450 implement a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

Each processing unit includes a large number (e.g., 128, etc.) of distinct processing cores (e.g., functional units) that may be fully-pipelined, single-precision, double-precision, and/or mixed precision and include a floating point arithmetic logic unit and an integer arithmetic logic unit. In an embodiment, the floating point arithmetic logic units implement the IEEE 754-2008 standard for floating point arithmetic. In an embodiment, the cores include 64 single-precision (32-bit) floating point cores, 64 integer cores, 32 double-precision (64-bit) floating point cores, and 8 tensor cores.

Tensor cores configured to perform matrix operations. In particular, the tensor cores are configured to perform deep learning matrix arithmetic, such as GEMM (matrix-matrix multiplication) for convolution operations during neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B may be integer, fixed-point, or floating point matrices, while the accumulation matrices C and D may be integer, fixed-point, or floating point matrices of equal or higher bitwidths. In an embodiment, tensor cores operate on one, four, or eight bit integer input data with 32-bit integer accumulation. The 8-bit integer matrix multiply requires 1024 operations and results in a full precision product that is then accumulated using 32-bit integer addition with the other intermediate products for a 8×8×16 matrix multiply. In an embodiment, tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each processing unit may also comprise M special function units (SFUs) that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the memory 404 and sample the texture maps to produce sampled texture values for use in shader programs executed by the processing unit. In an embodiment, the texture maps are stored in shared memory that may comprise or include an L1 cache. The texture units implement texture operations such as filtering operations using mipmaps (e.g., texture maps of varying levels of detail). In an embodiment, each processing unit includes two texture units.

Each processing unit also comprises N load store units (LSUs) that implement load and store operations between the shared memory and the register file. Each processing unit includes an interconnect network that connects each of the cores to the register file and the LSU to the register file, shared memory. In an embodiment, the interconnect network is a crossbar that can be configured to connect any of the cores to any of the registers in the register file and connect the LSUs to the register file and memory locations in shared memory.

The shared memory is an array of on-chip memory that allows for data storage and communication between the processing units and between threads within a processing unit. In an embodiment, the shared memory comprises 128 KB of storage capacity and is in the path from each of the processing units to the memory partition unit 480. The shared memory can be used to cache reads and writes. One or more of the shared memory, L1 cache, L2 cache, and memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory enables the shared memory to function as a high-throughput conduit for streaming data while simultaneously providing high-bandwidth and low-latency access to frequently reused data.

When configured for general purpose parallel computation, a simpler configuration can be used compared with graphics processing. Specifically, fixed function graphics processing units, are bypassed, creating a much simpler programming model. In the general purpose parallel computation configuration, the work distribution unit 425 assigns and distributes blocks of threads directly to the processing units within the GPCs 450. Threads execute the same program, using a unique thread ID in the calculation to ensure each thread generates unique results, using the processing unit(s) to execute the program and perform calculations, shared memory to communicate between threads, and the LSU to read and write global memory through the shared memory and the memory partition unit 480. When configured for general purpose parallel computation, the processing units can also write commands that the scheduler unit 420 can use to launch new work on the processing units.

The PPUs 400 may each include, and/or be configured to perform functions of, one or more processing cores and/or components thereof, such as Tensor Cores (TCs), Tensor Processing Units (TPUs), Pixel Visual Cores (PVCs), Ray Tracing (RT) Cores, Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC)

CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard. In yet another embodiment, the PPU 400 may be realized in reconfigurable hardware. In yet another embodiment, parts of the PPU 400 may be realized in reconfigurable hardware.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
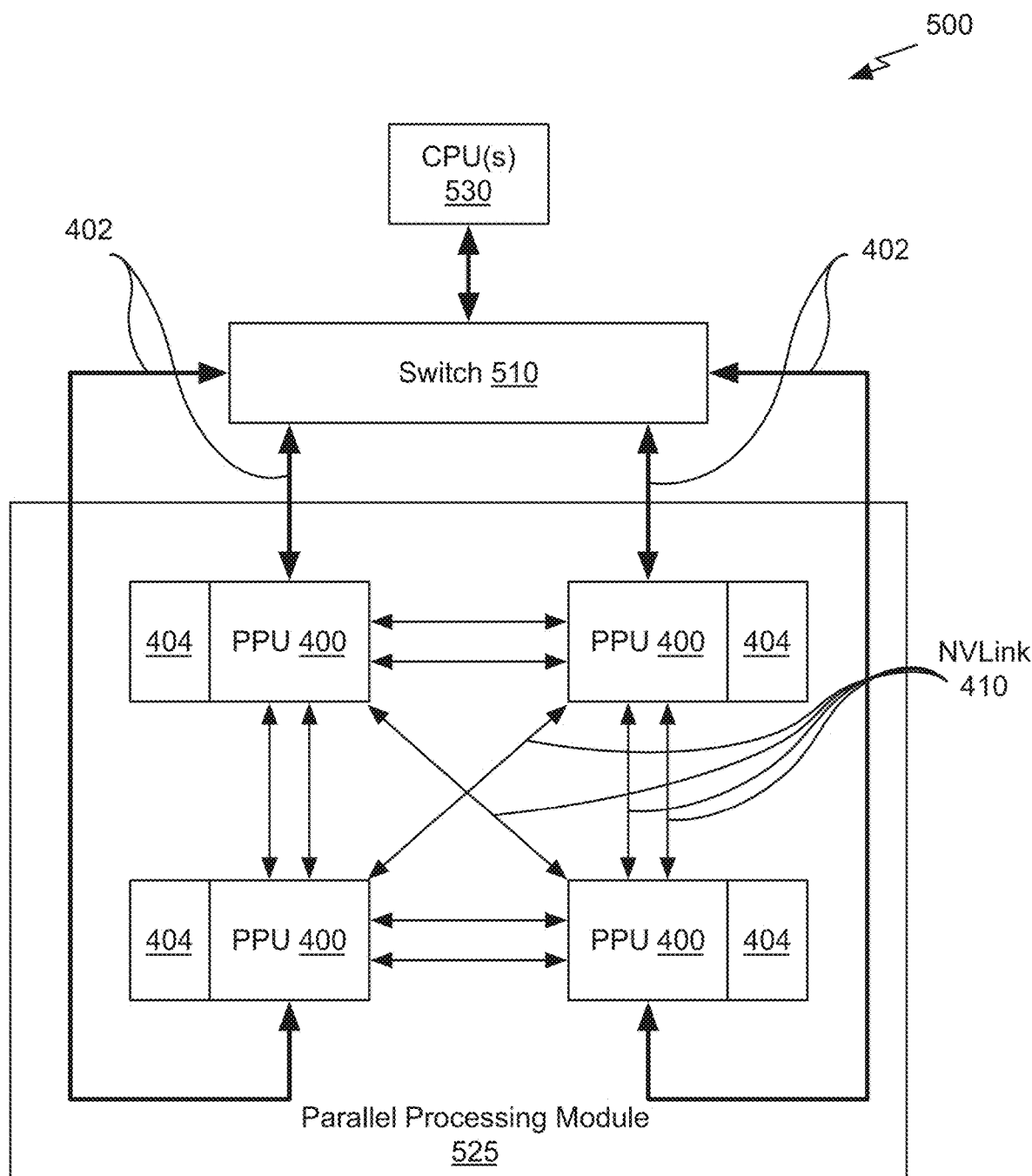
FIG. 5A is a conceptual diagram of a processing system implemented using the PPU of FIG. 4, suitable for use in implementing some embodiments of the present disclosure.

FIG. 5A is a conceptual diagram of a processing system 500 implemented using the PPU 400 of FIG. 4, in accordance with an embodiment. The exemplary system 500 may be configured to implement the method 150 shown in FIG. 1B.

Figure 5B:
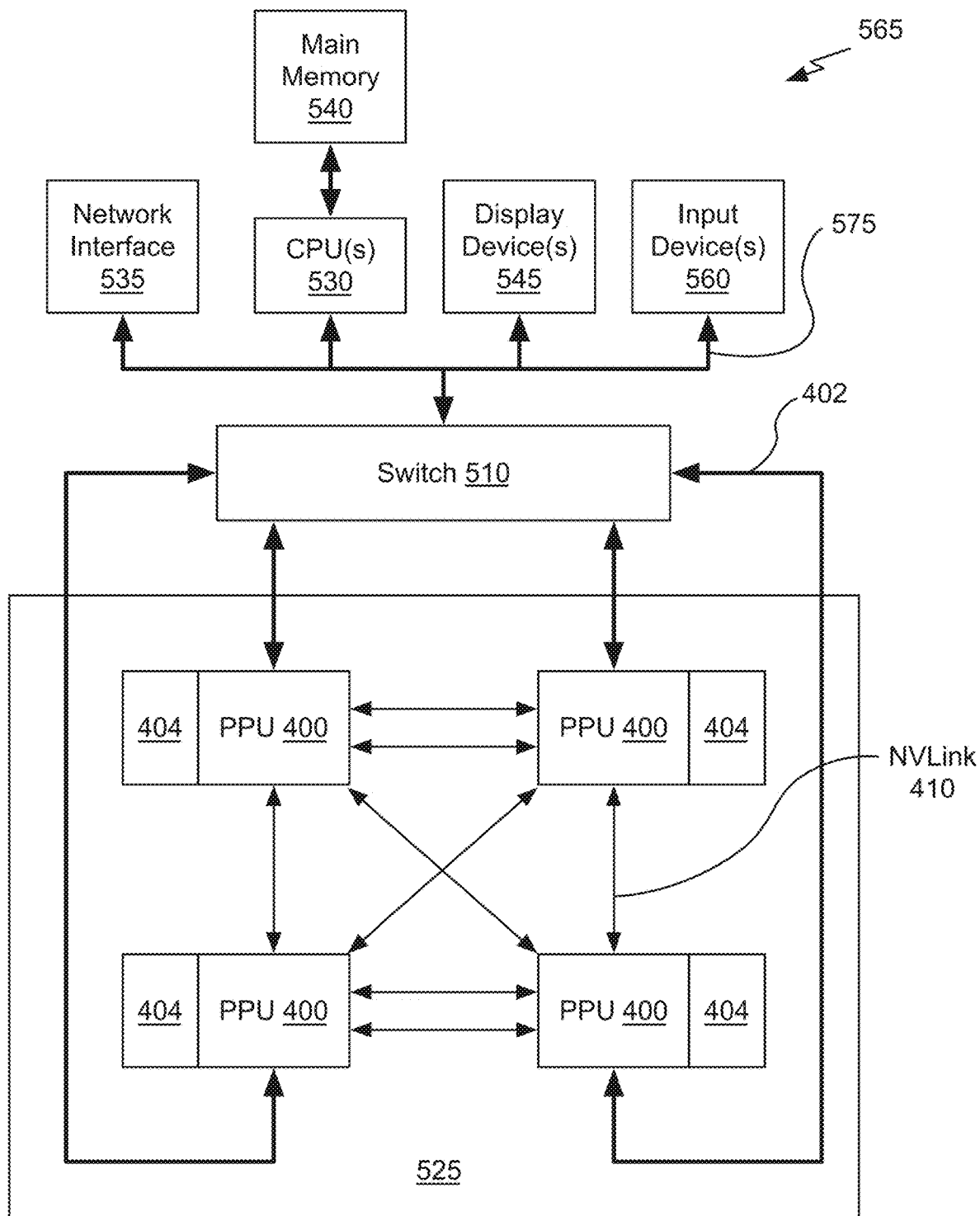
FIG. 5B illustrates an exemplary system in which the various architecture and/or functionality of the various previous embodiments may be implemented.

The NVLink 410 provides high-speed communication links between each of the PPUs 400. Although a particular number of NVLink 410 and interconnect 402 connections are illustrated in FIG. 5B, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented. The exemplary system 565 may be configured to implement the method 150 shown in FIG. 1B.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Although the various blocks of FIG. 5B are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5B is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5B.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may be implemented as a network interface controller (NIC) that includes one or more data processing units (DPUs) to perform operations such as (for example and without limitation) packet parsing and accelerating network processing and communication. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5A and/or exemplary system 565 of FIG. 5B. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, placement guidance generated applying one or more of the techniques disclosed herein may be used to layout VLSI circuits that are employed in machines or robots to manipulate, handle, or modify physical objects in the real world. Furthermore, such VLSI circuits may be employed in autonomous vehicles to navigate and move the vehicles through the real world. Additionally, VLSI circuits produced applying one or more of the techniques disclosed herein may be used to convey information to users of such machines, robots, and vehicles.

Figure 5C:
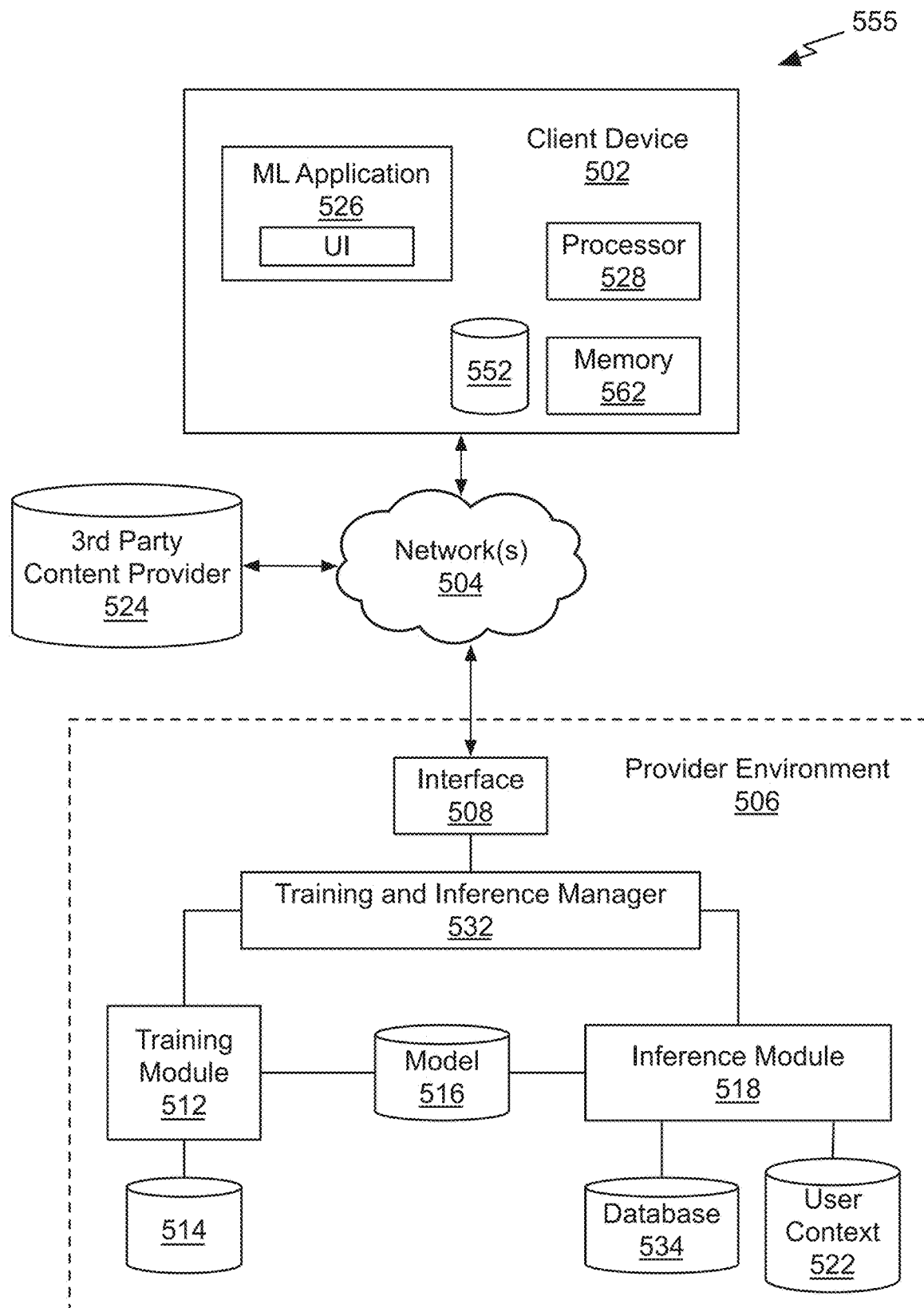
FIG. 5C illustrates components of an exemplary system that can be used to train and utilize machine learning, in at least one embodiment.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 400 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data.

In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Example Streaming System

Figure 6:
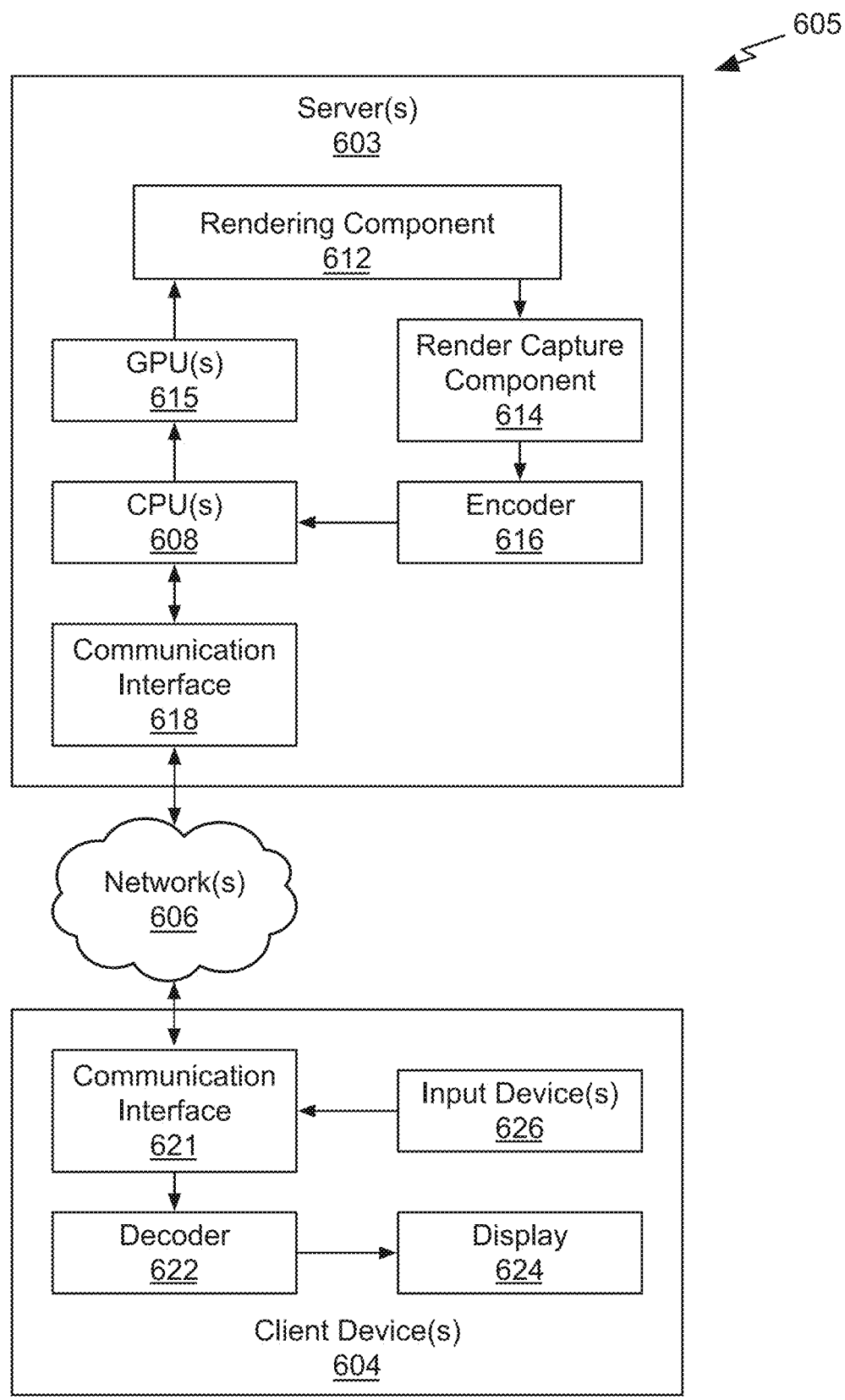
FIG. 6 illustrates an exemplary streaming system suitable for use in implementing some embodiments of the present disclosure.

FIG. 6 is an example system diagram for a streaming system 605, in accordance with some embodiments of the present disclosure. FIG. 6 includes server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In an embodiment, the streaming system 605 is a game streaming system and the server(s) 603 are game server(s). In the system 605, for a game session, the client device(s) 604 may only receive input data in response to inputs to the input device(s) 626, transmit the input data to the server(s) 603, receive encoded display data from the server(s) 603, and display the display data on the display 624. As such, the more computationally intense computing and processing is offloaded to the server(s) 603 (e.g., rendering—in particular ray or path tracing—for graphical output of the game session is executed by the GPU(s) 615 of the server(s) 603). In other words, the game session is streamed to the client device(s) 604 from the server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the server(s) 603. The client device 604 may receive an input to one of the input device(s) 626 and generate input data in response. The client device 604 may transmit the input data to the server(s) 603 via the communication interface 621 and over the network(s) 606 (e.g., the Internet), and the server(s) 603 may receive the input data via the communication interface 618. The CPU(s) 608 may receive the input data, process the input data, and transmit data to the GPU(s) 615 that causes the GPU(s) 615 to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method, comprising:
   receiving a connectivity representation for cell instances of an integrated circuit;
   processing, according to parameters, the connectivity representation and characteristics for each cell instance to generate clustering guidance for each cell instance;
   updating the parameters to optimize metrics using the clustering guidance;
   repeating the processing using the updated parameters to update the clustering guidance; and
   producing cell cluster assignments for the cell instances based on the updated clustering guidance.

2. The computer-implemented method of claim 1, further comprising initializing the parameters by:
   producing learned embeddings for each cell instance from the connectivity representation and the characteristics; and
   computing a first portion of the parameters to minimize a similarity loss for the learned embeddings.

3. The computer-implemented method of claim 2, further comprising computing a second portion of the parameters from the learned embeddings.

4. The computer-implemented method of claim 1, wherein the connectivity representation comprises a netlist graph and each cell instance corresponds to a node in the netlist graph.

5. The computer-implemented method of claim 4, further comprising, before processing the connectivity representation, transforming the netlist graph by inserting an edge corresponding to a timing path between a start point and an end point of the timing path, the edge bypassing at least one node between the start point and the end point.

6. The computer-implemented method of claim 1, wherein the characteristics for each cell instance comprise estimated timing, power consumption, and congestion for an initial placement.

7. The computer-implemented method of claim 1, wherein the clustering guidance comprises clustering probabilities for each cell instance.

8. The computer-implemented method of claim 1, wherein the processing comprises:
   producing learned embeddings for each cell instance by applying a first portion of the parameters to the connectivity representation and the characteristics; and
   applying a second portion of the parameters to the learned embeddings to compute the clustering guidance for each cell instance.

9. The computer-implemented method of claim 1, wherein updating the parameters comprises minimizing a loss function computed using the clustering guidance for the metrics that include at least one of a timing loss, a congestion loss, and a power loss.

10. The computer-implemented method of claim 9, wherein the loss function includes a clustering loss that is computed using the clustering guidance.

11. The computer-implemented method of claim 1, wherein producing the cell cluster assignments comprises, for each cell instance, identifying a highest probability value defined in the updated clustering guidance.

12. The computer-implemented method of claim 1, wherein at least one of the steps of receiving, processing, updating, and producing are performed on a server or in a data center to produce the cell cluster assignments, and the cell cluster assignments are streamed to a user device.

13. The computer-implemented method of claim 1, wherein at least one of the steps of receiving, processing, updating, and producing are performed within a cloud computing environment.

14. The computer-implemented method of claim 1, wherein the integrated circuit is employed in a machine, robot, or autonomous vehicle.

15. The computer-implemented method of claim 1, wherein at least one of the steps of receiving, processing, updating, and producing is performed on a virtual machine comprising a portion of a graphics processing unit.

16. The computer-implemented method of claim 1, wherein updating the parameters comprises:
   computing a congestion score for each cell instance; and
   equalizing the congestion scores across the cell clusters to minimize a congestion loss function.

17. The computer-implemented method of claim 1, wherein updating the parameters comprises:
   computing switching activity for each cell instance; and
   aggregating the cell instances with high switching activity into a subset of the cell clusters to minimize a power loss function.

18. The computer-implemented method of claim 1, wherein updating the parameters comprises:
   computing cut sizes of timing critical paths for each cell instance; and
   minimizing a timing loss function using the cut sizes.

19. A system, comprising:
   a memory that stores a connectivity representation for cell instances of an integrated circuit; and
   a processor that is connected to the memory, wherein the processor is configured to produce cell cluster assignments for the cell instances by:
      process, according to parameters, the connectivity representation and characteristics for each cell instance to generate clustering guidance for each cell instance;
      update the parameters to optimize metrics using the clustering guidance;
      repeat the processing using the updated parameters to update the clustering guidance; and
      produce the cell cluster assignments based on the updated clustering guidance.

20. The system of claim 19, wherein the characteristics for each cell instance comprise estimated timing, power consumption, and congestion for an initial placement.

21. The system of claim 19, wherein updating the parameters comprises minimizing a loss function computed using the clustering guidance for the metrics that include at least one of a timing loss, a congestion loss, and a power loss.

22. A non-transitory computer-readable media storing computer instructions that, when executed by one or more processors, cause the one or more processors to perform the steps of:

receiving a connectivity representation for cell instances of an integrated circuit;

processing, according to parameters, the connectivity representation and characteristics for each cell instance to generate clustering guidance for each cell instance;

updating the parameters to optimize metrics using the clustering guidance;

repeating the processing using the updated parameters to update the clustering guidance; and producing cell cluster assignments for the cell instances based on the updated clustering guidance.

23. The non-transitory computer-readable media of claim 22, wherein the characteristics for each cell instance comprise estimated timing, power consumption, and congestion for an initial placement.

* * * * *